Patented June 9, 1936

2,043,641

UNITED STATES PATENT OFFICE 2,043,641

CEMENT COMPOSITION

George Witty, Long Island City, N. Y.

No Drawing. Application July 24, 1935,
Serial No. 32,970

2 Claims. (Cl. 106—24)

The object of the invention is to provide an improved cement which will be hard, fire-proof, sound-proof, water-proof and a non-conductor of heat, sound and electricity; and provide further a cement which may be used as wall plaster or mortar, or may be made up into any desirable shape; and to provide further a cement which may be worked smooth or rough-surfaced, and which also may be polished, or given a color or tint, in a word, lend itself to a large variety of uses, particularly in the plastic art.

A further object is to provide a cement composition which will be cheap to manufacture and adopted for shipment in dry powder form to be mixed with water for use.

My invention consists of a mixture of granulated blast furnace slag, calcium hydroxide, calcium sulphate, dextrin, silica, glass sand, potassium sulphate, and magnesium silico fluoride. In preparing the cement I prefer to use the ingredients thoroughly mixed and in about the following proportions: 50 pounds granulated blast furnace slag, 20 pounds calcium hydroxide, 12 pounds calcium sulphate, 7 pounds of dextrine, 6 pounds of silicia, 3 pounds of glass sand, 1 pound potassium sulphate, 1 pound magnesium silico fluoride, total 100. From experience I have found that potassium sulphate when used alone without the addition of magnesium silico fluoride results in a quick setting product; when used with the other ingredients of my composition while with the addition of magnesium silico fluoride a retardation in the setting is produced, thereby affording opportunity of applying the composition. Furthermore, the addition of the magnesium silico fluoride tends materially to retain the potassium sulphate in suspension whereby the homogeneous mixture of the potassium sulphate with the magnesium silico fluoride and other ingredients is obtained. Calcium sulphate is used as a binder and the addition of dextrin produces a better binder and when combined with potassium sulphate and magnesium silico fluoride is rendered fire-proof and with a crushing strength equal to a natural stone.

My improved cement can be used for floor-covering, artificial marble, insulating or deadening artificial tile and other kinds of casting ornamental work.

It will be understood that slight changes in the proportions are contemplated within the scope of the invention as set forth in the claims.

Having fully described my invention what I claim as new and desire to secure by Letters Patent is:

1. A cement composition consisting of granulated blast furnace slag, calcium hydroxide, calcium sulphate, dextrin, silica, glass sand, potassium sulphate and magnesium silico fluoride.

2. A cement composition 50 parts by weight of blast furnace slag, 20 parts by weight of calcium hydroxide, 12 parts by weight of calcium sulphate, 7 parts by weight of dextrin, 6 parts by weight of silica, 3 parts by weight of glass sand, and 1 part of each by weight of both potassium sulphate and magnesium silico fluoride.

GEORGE WITTY.